US 6,537,077 B1

(12) United States Patent
Johnson (10) Patent No.: US 6,537,077 B1
(45) Date of Patent: Mar. 25, 2003

(54) TRAINING AID FOR SKATERS AND METHODS RELATED THERETO

(75) Inventor: Michael E. Johnson, 46 Riverside Dr., Hanover, MA (US) 02339

(73) Assignees: Michael E. Johnson, Hanover, MA (US); Andrea Harding, Lexington, MA (US)

( * ) Notice: Subject to any disclaimer, the term of this patent is extended or adjusted under 35 U.S.C. 154(b) by 0 days.

(21) Appl. No.: 09/576,339

(22) Filed: May 22, 2000

(51) Int. Cl.⁷ ................................................ G09B 19/00
(52) U.S. Cl. ............................ 434/258; 482/69; 482/66
(58) Field of Search ................................. 434/258, 247, 434/255; 482/66, 68, 69

(56) References Cited

U.S. PATENT DOCUMENTS

| 16,150 A | * 12/1856 | Robbins |
| 320,462 A | 6/1885 | Cowing |
| 1,253,314 A | 1/1918 | Warner |
| 2,719,568 A | 10/1955 | Webb |
| 2,900,008 A | 8/1959 | Seger |
| 3,695,609 A | 10/1972 | Rothe |
| 3,721,436 A | 3/1973 | Barthel, Jr. |
| 3,844,554 A | 10/1974 | LaMontagne |
| 4,005,859 A | 2/1977 | Tait |
| 4,018,439 A | 4/1977 | Kauk |
| 4,021,033 A | 5/1977 | Auclair et al. |
| 4,114,873 A | * 9/1978 | Jones ........................... 272/61 |
| 4,545,575 A | * 10/1985 | Forjot ........................... 272/97 |
| 5,033,734 A | 7/1991 | Jalbert |

* cited by examiner

*Primary Examiner*—Derris H. Banks
*Assistant Examiner*—Urszula M Cegielnik
(74) *Attorney, Agent, or Firm*—David G. Conlin; William J. Daley, Jr.; Edwards & Angell, LLP (57) ABSTRACT

Featured is a device and a method using such a device for training skaters, particularly ice skaters. According to the method for training a skater there is provided a support frame and a harness that is secured to the support frame. The skater is secured to the support frame by means of the harness so that the point of attachment between the support frame and the harness is a distance above the head of the skater. Further the support frame being provided is configured and arranged so as to extend about and from the skater when the skater is secured to the support frame. The support frame is moved, responsive to a skating motion of the skater, with respect to a surface upon which the skater is skating. In more particular embodiments, the support frame includes a plurality or more of support members that are arranged so as to form a structure about the skater to which is secured the harness.

17 Claims, 5 Drawing Sheets

TRAINING AID FOR SKATERS AND METHODS RELATED THERETO

FIELD OF INVENTION

The present invention relates to a training aid for skating and methods related thereto.

BACKGROUND OF THE INVENTION

In order to learn to skate, it is necessary that the individual acquire a sense of balance that is learned by experience through skating. The learning period needed to acquire this sense of balance depends upon the individual's ability and is usually marked by frequent falling to the ice or other hard surface resulting in cuts, bruises, sprains and possible serious injury such as broken or fractured bones. Consequently, beginning skaters, whether young or old, experience considerably difficulty in mastering the sport of skating, often out of a fear of falling and suffering an injury. Once a person has taken a particularly bad fall, the person often becomes so afraid that they give up on the sport altogether or become so cautious that the learning process is slow and lengthy.

It is not uncommon to see a person who is learning to skate to be holding onto someone, preferably an experienced skater. This holding onto, however, does not insure against an occasional fall, which also can include both the learner and the experienced skater. Because the development of self-confidence and the sense of balance is an essential ingredient of the skating learning process, the beginner preferably should not begin learning to skate by leaning on another or at least should not continue to lean on someone for security but instead, go it alone as soon as possible.

The need for training and safety devices for beginning skaters has been recognized and a number of these skating aids have been proposed or patented. These aids, however, have the disadvantages that they tend to restrict or confine the user in a manner that limits the ability to skate in the natural skating position. A number of these aids also include a handrail that is grasped by the skater as a security against falling. The handrail also constitutes the sole mechanism by which the aid is moved along by the skater. If the skater becomes distracted and releases their grip on the handrail, then the aid typically loses its source of motive power and directional control. Thus, in addition to creating the potential for falling because they have released the handrail, the aid itself could comprise an interference to the skater. In any event, these aids in effect provide a mechanism for the skater to continuously lean on.

There is described in U.S. Pat. No. 5,033,734 a mobile skating aid that includes a surrounding main frame supported at approximately waist-height on telescoping posts which extend upwardly from a pair of elongated runners intended to continuously contact the skating surface. A seat element is flexibly suspended from the main frame at an adjustable distance below the main frame at a height to be straddled by the skater. This seat element provides a safety catch that prevents the skater from falling even if the skater completely looses footing or traction. The main frame further includes a handrail element that the skater grasps during use such as illustrated in FIG. 4 thereof. While such a device provides a mechanism to catch a falling skater, such a device includes a handrail as a leaning on mechanism and as the means by which the skater can push the aid along the ice. Such a device also does not provide a mechanism by which the skater can distribute 100% of their weight onto the surface.

It thus would be desirable to provide a new skating aid that would provide security to the skater against injury from falling and methods related thereto for training a skater. It would be particularly desirable to provide such a skating training aid and related training method that would not require the skater to push or hold the training aid while skating in comparison to prior art devices. Such skating training devices preferably would be simple in construction and less costly than prior art devices and such methods would not require highly skilled users to utilize the device.

SUMMARY OF THE INVENTION

The present invention features a novel training aid or device for skaters and training methods related thereto, Such a training aid or device generally includes a support frame and a harness secured to the support frame at a location that is above the head of the skater and that is configured and arranged so a portion thereof is removably secured about the skater. The support frame is configured and arranged so as to extend about and from the skater when the skater is secured in the harness. The support frame also is configured and arranged so as to be moveably disposed upon the skating surface and thereby being moveable by the skater responsive to a skating motion. When the skating surface is ice, the support frame includes a mechanism at an interface between the ice and the support frame whereby the support frame is slidably disposed on the ice. Additionally, the harness is pivotably mounted to the support frame.

In specific embodiments, the support frame according to the present invention is configured and arranged so as to include a plurality of support members. Each support member has first, second and third portions where the first and third portions are mechanically interconnected to opposite ends of the second portion and each at an angle with respect to the second portion. The second portions of the respective plurality of support members are secured to each other at a point of intersection so the second portions are at a second angle with respect to each other. Also, the harness is secured to the support frame proximal the point of intersection. In a specific embodiment, the second portions are arcuate and the first and third portions are substantially straight. Alternatively, Each support members is arcuate and generally parabolic in shape and the point of intersection corresponds to the vertex of each support member.

The angle between the support member first and second portions and the third and second portions is established such that the support frame has sufficient stiffness and strength to support the weight of the skater. Also, the second portions of the respective plurality of support members are secured to each other at the point of intersection so the second portions are at an angle of about 90 degrees with respect to each other. The support frame also can further include cross members that extend between adjacent portions of the plurality of support members so as to maintain the support members in fixed relation.

The support frame according to the present invention also can be configured and arranged so as to include three or more support members, each having a proximal end and a first portion extending from the proximal end. The proximal ends of each of the three support members are secured to each other so the first portions of the three support members are spaced from each other about a common point and disposed a distance above the head of the skater. Further, the harness is secured to the first portions of support members proximal to the common point.

More particularly, each support member further includes a second portion mechanically interconnected to the member first portion and wherein the second portions of the three support members are spaced laterally from the skater when the skater is disposed in the harness. The support frame also can further include cross members that extend between adjacent members of the three support members so as to maintain the three support members in fixed relation. The support frame also can be configured to include four or five of the above described support members.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
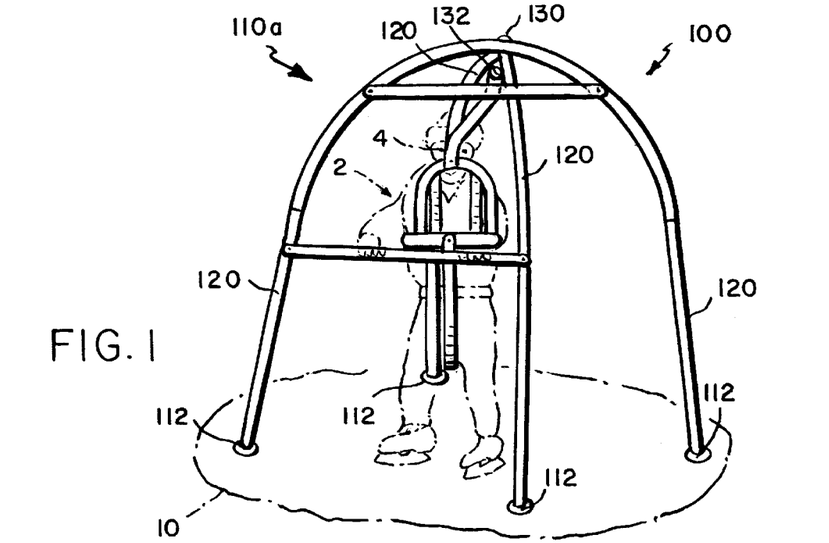
FIG. 1 is a perspective view of a skating training device according to the present invention.
Figure 3:
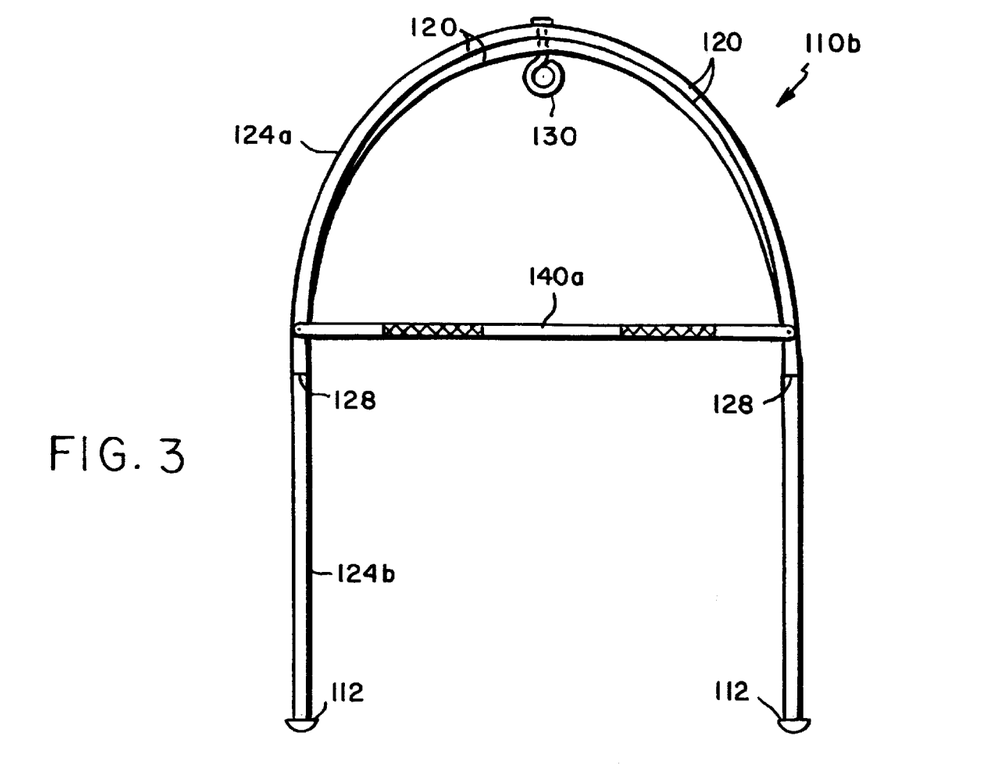
FIG. 3 is an elevation view of the support frame of FIG. 2.
Figure 4A:
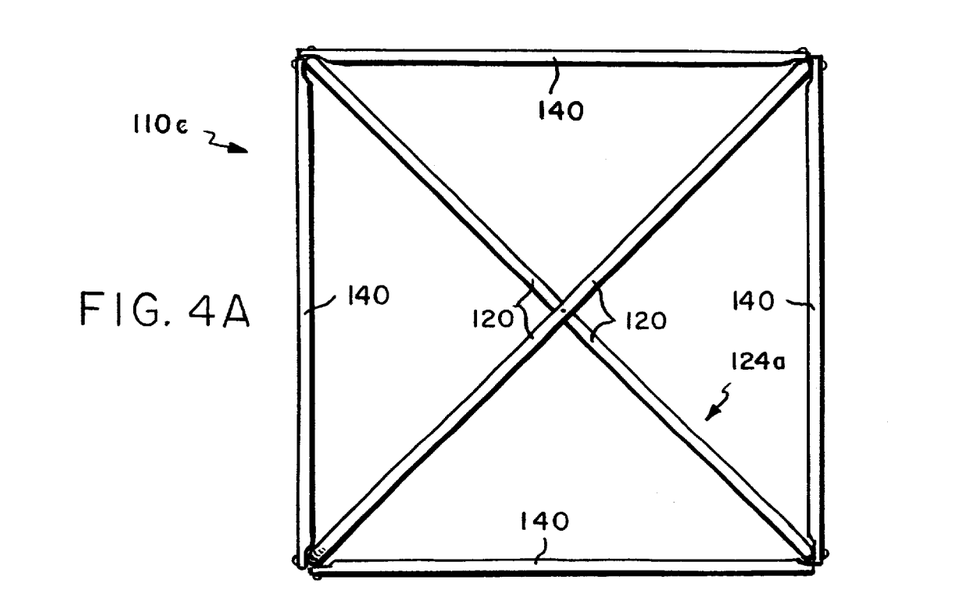
FIG. 4A is a top view of the support frame of FIG. 2 illustrating another alternative cross-member attachment embodiment for the skating training device of FIG. 1.
Figure 4B:
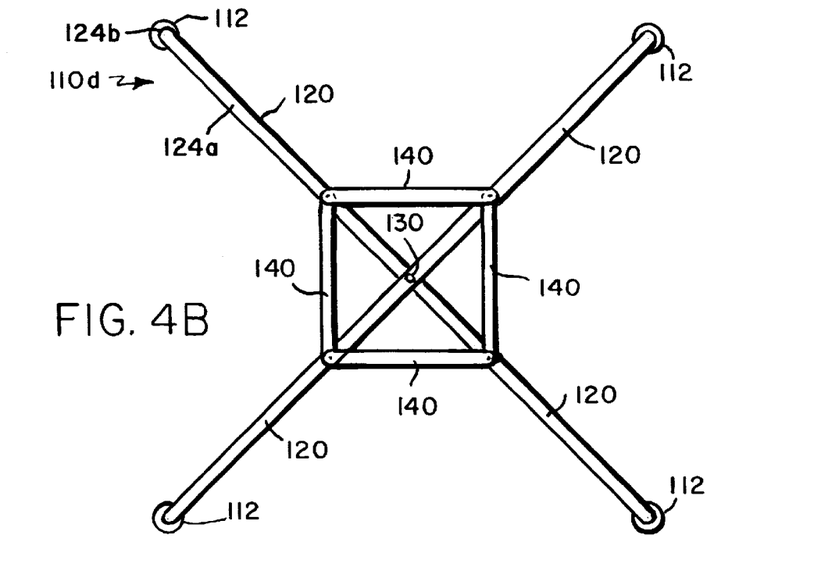
FIG. 4B is a top view of the support frame of FIG. 2 illustrating yet another alternative cross member attachment embodiment for the skating training device of FIG. 1.
Figure 5A:
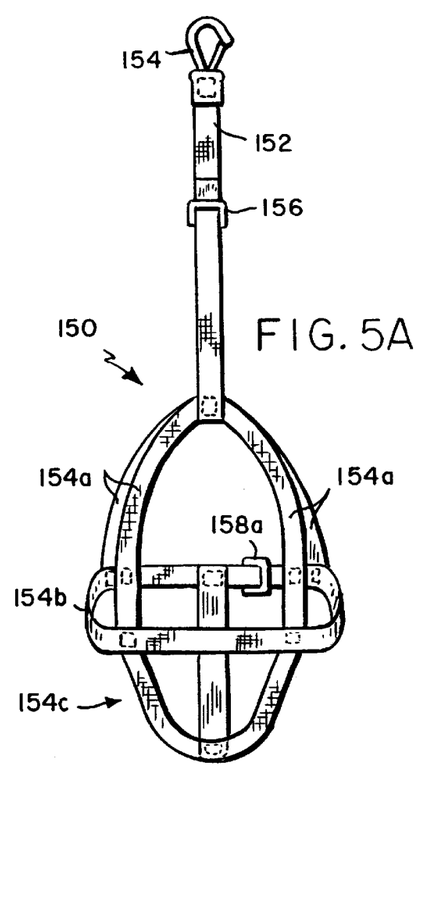
FIGS. 5A,B are back and front views respectively of an exemplary harness.

Referring now to the various figures of the drawing wherein like reference characters refer to like parts, there is shown in FIG. 1 a perspective view of a skating training aid or device 100 according to the present invention, there is shown in FIGS. 2–4 and 6–7 various views of various support frames for such a skating training device and there is shown in FIGS. 5A,B an exemplary harness 150 used in conjunction with a skating training device according to the present invention. In the following discussion reference numeral 110 is used to generally identify the support frame of a skating training device according to the present invention, however, when reference is made to a support frame having a particular illustrated construction then the reference numeral will further include an alpha character (e.g., 110a, 110b) so as to uniquely identify the embodiment being particularly described. More specifically, there is shown in FIGS. 1–4, one embodiment of a skating training device 100 according to the present invention including a support frame 110 and a harness 150 that is interconnected to the support frame so as to be suspended from the support frame.

As described further herein the harness 150 is attached or secured to the support frame 110 so the point of attachment is above the head 4 of the skater 2. In this way, a skater 2 that is secured within the harness 150 also is secured to the support frame 110. Thus, if the skater 2 looses traction or their footing the support frame 110 can prevent the skater from falling onto the skating surface 10. As also described further herein the harness 150 is preferably configured so the distance between the skater's head and the support frame is adjustable, thereby being adjustable to different height skaters. Although a portion of the harness 150 appears to be in front of the skater (shown in phantom in FIG. 1), this portion preferably extends proximal the upper back of the skater and behind the skater's head 4 to the support frame 110a.

Preferably, the harness 150 is adjusted such that when the skater 2 is standing freely in their skates, the harness relaxes virtually allowing the skater to stand on their own. Such adjustability of the harness 150 also provides a mechanism by which the skater 2 can the adjust the amount of freedom they have before the harness stiffens and the skater is thus being suspended from the support frame as a function of the ability of the skater to remain upright or their skating otherwise improves. Consequently, the skating training aid can be adjusted to approximately correspond to the level of skating ability while reducing or minimizing the risk of serious injury to the skater.

Also, because the harness 150 is secured directly to the support frame 110, the support frame can move responsive to the skating motion of the skater 2. Thus, while the skating training aid 100 of the present invention can be configured with a handle member 148 as a further training aid, such a handle member 148 is not needed for a skater 2 to steer or otherwise push the support frame along.

The support frame 110a illustrated in FIG. 1 includes a plurality of support members 120 and an interconnecting mechanism 130. The interconnecting mechanism 130 joins and interconnects the support members 120 at a midpoint 122 of each and provides an attachment point for the harness 150. As more clearly illustrated in FIGS. 2–3, each support member 120 comprises an arcuate segment 124a and two straight segments 124b mechanically interconnected thereto or formed as a single member. In an alternative embodiment, each support member 120 is arcuate, for example so as to present a parabolic type of shape.

Each of the support members 120 are interconnected to each other at about the midpoint 122 and are arranged so that the arcuate segments 124a of the respective support members are at an angle with respect to each other. In an exemplary embodiment, the arcuate segments 124a of the support members 120 are arranged orthogonal with respect to each other so that the support members when so arranged form a dome or silo shape. Other angles between the support member arcuate segments 124a are contemplated and such other angles are established so the support frame 110a has sufficient strength and stiffness to be capable of withstanding the loads and forces being imposed on the support frame during use, including the weight of the skater. The angles also are selected so that the support frame 110a does not tip over during normal use and thus become an interference to the skater. Preferably, the angles between the arcuate segments 124a also are selected so the support frame 110a can be moved in any direction responsive to the skating motion of the skater, without having to reposition the support frame to travel in a given direction. In other words, the support frame of the present invention is preferably configured so that it does not have to be turned so as to be particularly aligned with the direction in which the skater is going as is required when using a number of prior art skating aids.

The interconnecting mechanism 130 is any of a number of mechanisms or devices known in the art that can join the plurality of support members 120 together and maintain the joint or interconnection when subjected to the anticipated loads and forces. Preferably, the interconnection between the support members 120 is a temporary type of connection so that the support frame 110 can be disassembled when not in use. For example, the interconnecting mechanism forms a mechanical interconnection between the support members 120, for example a nut and bolt type of connection, where the bolt is inserted through holes at about the midpoint 122 of in each of the support members 120 and the nut(s) secure the joint. Other types of interconnecting mechanisms 130 include clip or clamp type of connections that are configured so as to disposed about and grasp an exterior surface of each support member 120. It is within the scope of the present invention for a permanent interconnection to be made between the support members 120 for example, by means of adhesives, welding, brazing and the like. It also is within the scope of the present invention for the support frame to comprise four support members, each having an arcuate segment 124a and a straight segment 14b. Each of the support members would be secured at about the midpoint in the fashion described hereinafter for FIG. 6 or by means of a hub member 526 as described hereinafter for FIG. 7.

The interconnecting mechanism 130 also is further configured and arranged to include any of a number of mechanism, features or artifacts known in the art that provides an attachment point for the harness. In the illustrated embodiment, the interconnecting mechanism 130 is a threaded bolt having a through eye 132 at one end thereof that is bolted to the support members 120. The through eye 132 is sized so as to receive therein a snap hook or hook eye 154 of the harness 150. See also the following discussion for FIGS. 8–9 for two exemplary interconnecting mechanisms 630,730 contemplated for use with a skating training device according to the present invention.

The support frame 110a further includes a plurality or more of cross-members 140 that extend between adjacent segments of the support members 102. As illustrated in FIGS. 1, the cross-members 140 are disposed so as to extend between a portion of the adjacent arcuate segments 124a of the support members 120. Each end of each cross-member 140 is secured to the arcuate segment 124a using any of a number of techniques known in the art, including mechanical connectors (e.g., nuts and bolts, clips, clamps) and adhesives. This thereby secures the adjacent arcuate segments 124a of the support members 120 so that the support members are maintained in fixed relationship to each other. In a more specific embodiment, the technique selected establishes a connection that removably secures the cross members 140 to the support members.

Figure 2:
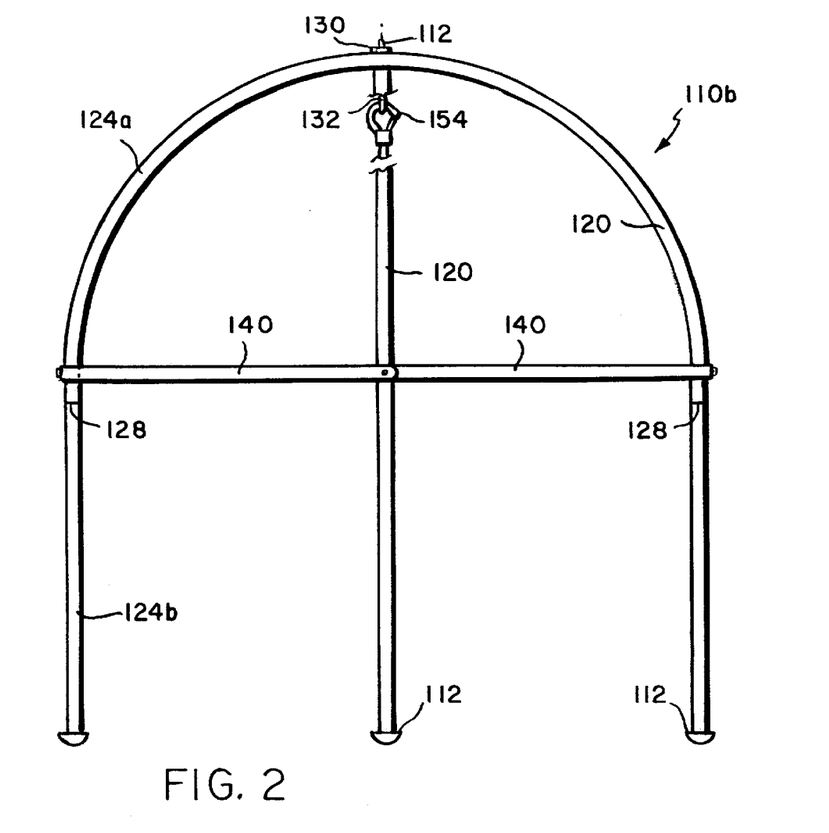
FIG. 2 is an elevation view of the side of another support frame illustrating an alternative cross member attachment embodiment for the skating training device of FIG. 1.

In alternative embodiments the cross-members 140 can be positioned and secured at different locations of the support members 120. There is shown in FIGS. 2–3, another support frame 110b in which the cross-members 140 extend between a portion of adjacent arcuate segments 124a of the support members 120 that is proximal the intersection of an arcuate segment and a corresponding straight segment 124b. As shown in FIG. 4A, the cross members 140 of yet another support frame 110c extend between and are secured to the adjacent straight segments 124b of the support members 120. In yet another embodiment for a support frame 110d (see FIG. 4B), the cross members are secured to an upper portion of the adjacent arcuate segments 124a of the support members 120.

In the foregoing, four cross members 140 are illustrated, however, this shall not be construed as a limitation. It is within the scope of the present invention for adjacent support members to be secured in fixed relation using one (e.g., see FIG. 7) or more cross members. It also is within the scope of the present invention for the support frame 110 to include one or more sets of such cross members 140. For example, a support frame is configurable with one set of cross members 140 secured to the arcuate segments 124a as illustrated in FIG. 1 and another set of cross members secured to the straight segment 124b such as proximal the ends 112 of the support members 120 (see also FIG. 4A. The location of the cross-members 140 and the number of sets of cross-members is established based on the desired rigidity and strength of the support frame comprising the skating training aid 100.

In a more particular embodiment, and referring now to FIG. 1, the skating training aid 100 further includes a handle member 148 that is secured to adjacent support members 120, more specifically the adjacent straight segments 124b thereof. The handle member 148 can further include surface treatments or grips in selected regions 149 thereof so as to improve the grasping capability of a skater. Such surface treatments include, but are not limited to, diamond shaped surface cuts to provide a roughen surface as well as pads and the like.

Preferably, the adjacent support members 120 include a plurality or more of points of attachment so that the handle member 148 can be positioned at an appropriate height for the skater. For example, the handle member 148 can be positioned so that it is about mid-shoulder height to allow the skater 2 to gain a greater sense of balance. Alternatively, and as shown in FIG. 3, one or more cross-members 140a is configured and arranged so as to include the selected regions 149 having such surface treatments and thus in effect also comprise a handle member for the skater.

The support members 120 are made from a hollow or solid material including metals such as aluminum, fiberglass and plastics and also can be formed so as to have in cross-section any of a number of geometric configurations including circular, hexagonal, or any other polygonal shape and a cross-sectional width. The material, cross-sectional width and geometric configuration is selected so as to yield a support member 120 having the required structural strength and stiffness to withstand the anticipated loads and forces that can be imposed thereon by a skater. In particular the support members 120 are designed so as to be capable of supporting the weight of a skater when in the assembled configuration. In an exemplary illustrative embodiment, the support member 120 is made of ½ inch diameter fiberglass or aluminum piping that is capable of supporting a weight of about 55 pounds.

Similarly, the cross-members 140 are made from a hollow or solid material including metals such as aluminum, fiberglass and plastics and also can be formed so as to have in cross-section any of a number of geometric configurations including circular, hexagonal, or any other polygonal shape and a cross-sectional width. The selected material, cross-sectional width and geometric configuration is selected so as to yield a cross member 140 having the required structural strength and stiffness so as to maintain the support members 120 in spaced and fixed relation when the support members 120 are being subjected to the loads and forces being imposed thereon by the skater 2. Also, the ends of the cross members 140 that are secured to the adjacent support members 120 are configured and arranged for such attachment. For example, the ends of a tubular shaped cross member could be flattened to facilitate attachment of the cross member to the support member. In an exemplary illustrative embodiment, the cross members 140 are made from a flat aluminum or fiberglass member and are secured mechanically to the support members 120 by means of nuts and bolt type of connection.

The ends 112 of each support members 120 are preferably configured with a device or arrangement so that the support frame is moveably disposed on the skating surface 10. In the illustrated embodiment, the ends 112 of the support members 120 are generally hemispherical in shape and made of a material such as hard plastic such that the ends are easily slidable across the skating surface 10 such as ice. This, however, shall not constitute a limitation as it is within the scope of the present invention for other end arrangements such as a flat member illustrated in FIG. 1 (e.g. hard plastic member) or devices (e.g., ball bearing or wheels) be used that are appropriate for making the support frame moveable across the skating surface 10 while maintaining the support frame's capability of preventing injury, not tipping over and otherwise interfering with the skating process.

In another more particular embodiment, each support member 120 comprises a plurality or more of sections that are mechanically interconnected to each so as to form the support member. In this way, each support member 120 can be broken down or disassembled when the skating training device is not in use so the skating training device is in a more compact form for travel and/or storage. It is not uncommon for a person to travel between their residence and the place of skating, so a more compact form for travel would be advantageous.

In an exemplary embodiment, and with reference to FIGS. 2–3, each support member 120 is configured so as to further include at least one, and more specifically two, section interconnections 128 at which each straight segment 124b is mechanically interconnected to the arcuate segment 124a using any of a number of techniques known in the art. For example, an end of the straight segment 124b can be configured with a reduced cross-sectional width so as to be capable of being received in the corresponding end of the arcuate segment 124a and frictional retained therein (e.g., friction fit, interference fit). A pin, nut and bolt or other mechanism or frictional force is used to maintain the ends of the arcuate and straight segment 124a,b in mechanical engagement. Alternatively, an elastic cord or spring element is disposed and secured with the arcuate and straight segments 124a,b so that the spring force generated by the elastic cord or spring element maintains the arcuate and straight segment ends in mechanical engagement. Reference also should be made to the following discussion regarding FIGS. 8–9 for other details that allow the skating training device according to the present invention to be broken down or disassembled so as to put the device into a more compact form.

Figure 5B:
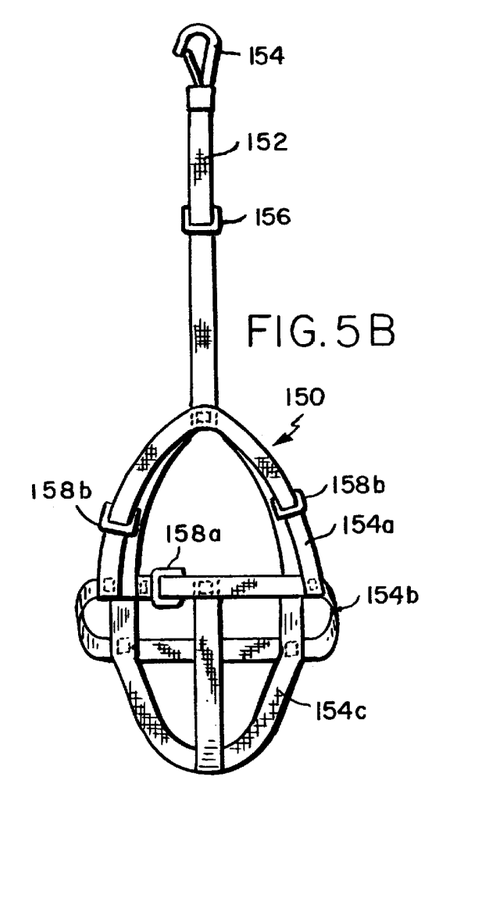

There is shown in FIGS. 5A,B back and front views respectively of an exemplary harness 150 that is secured to the interconnecting mechanism 130, more specifically the through eye 132 thereof. Such a harness 150 enables the skater 2 to be suspended from the support frame 110, safely without falling, injury or the fear or injury to skaters, particularly young skaters, whose objective it is to learn the skills and proper techniques to skating. Such a harness 150 or other support device or apparatus provides upper body support as well as keeping the upper body in proper alignment for skating since a young child typically lacks the balance and equilibrium that an adult has.

The illustrated harness 150 includes a height adjusting strap 152, a body harness portion secured to one end of the height adjusting strap, and a snap hook or hook eye 154 secured to the other end of the height adjusting strap. In the illustrated embodiment, the body harness portion includes shoulder straps 154a, a waist strap 154b and leg straps 154c. The shoulder straps 154a are secured to the waist strap 154b using any of a number of techniques known in the art to form a shoulder harness. The leg straps 154c also are arranged and secured to the waist strap using any of a number of techniques known in the art so as to prevent the skater from submarining or coming out of the bottom portion of the harness 150.

The height adjusting strap 152, the shoulder straps 154a, the waist strap 154b and the leg straps 154c are made of any of a number of materials known in the art, such as canvas, nylon, polyethelyne and the like which have sufficient strength to withstand the loads and forces that can be imposed thereon and which are easily made into a harness for example by means of appropriately stitching lengths of such material into the desired harness shape. Although straps are illustrated, it is within the scope of the present invention for other types of material configurations to be used that would otherwise be consistent with the teachings and purposes of the present invention. For example, a flat sheet of material within an aperture therein could be secured to the waist strap 154b instead of using shoulder straps.

The waist strap 154b preferably includes a buckle 158a or other device that allows the ends of the strap to be removable secured to each other. Also, each shoulder strap 154a preferably includes a buckle 158b or other device that allows the length of each shoulder strap to be adjusted. The height adjusting strap 152 also is configured using any of a number of techniques known in the art, whereby the length of the strap between the hook eye 154 and the harness body portion is adjustable for example, by means of a adjusting plastic buckle 156. It is within the scope of the present invention for the leg straps 154c to be adjustable.

The snap hook or hook eye 154 is configured so it easily hooks onto the through eye 132 of the interconnecting mechanism 130 and remains attached thereto during use of the skating training device. The hook eye 154 also is preferably detachable from the through eye 132 so that the skater 2 can get into and out of the harness 150 while it is not attached to the support frame 110. The hook eye 154 is preferably a pivoting hook eye that freely rotates in any direction. In this way, the skater 2 can turn in any direction, including a complete circle, without causing the support frame 110 to move in this turning direction. Thereafter, when the skater makes a skating motion, the support frame again moves in the direction of the skater. As indicated above, the support frame 110 is preferably arranged and configured so that the support frame does not have to be aligned with the direction of skating each time the skater turns. Providing a 360 degree range of motion allows a beginning skater a more natural progress of learning while the support frame continues to provide the necessary support to prevent injury from falling.

Although a snap hook or hook eye 154 is illustrated, this is not a limitation. It is within the scope of the present invention to use any of a number of devices known in the art for securing or removably securing a strap or other element of a support harness to a relatively fixed member. For example, a D-ring such as that used in mountain climbing can be adapted for use in the present invention.

Figure 6:
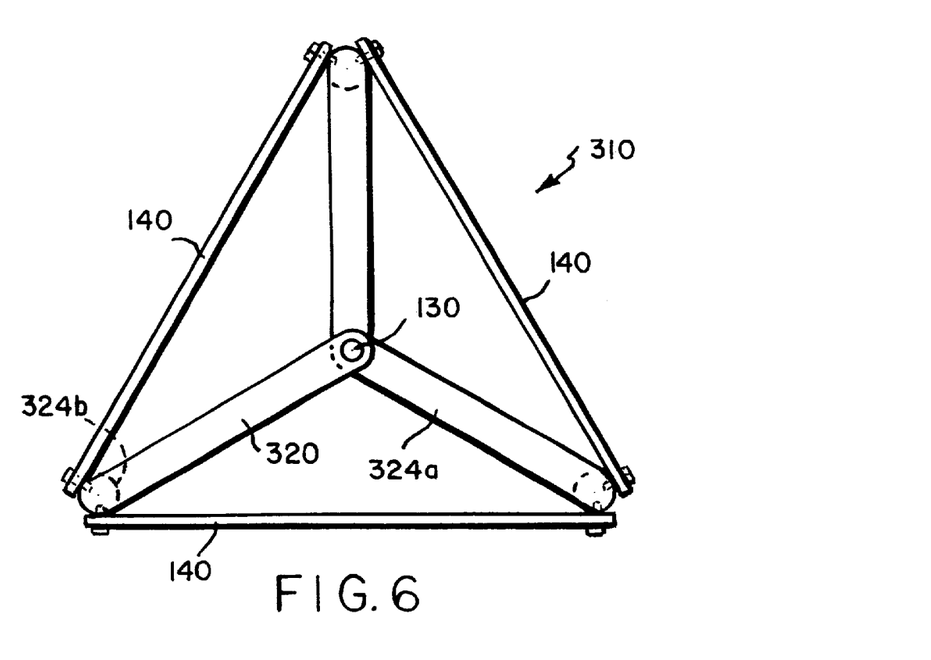
FIG. 6 is a top view of an alternative support frame for skating training device according to the present invention.

In FIGS. 1–4, and as described above, the support members 120 are arranged so the support frame 110a–c generally forms an "X" or cross-shaped structure having four legs extending upwardly from the skating surface 10. This shall not constitute a limitation, however, as the skating training device according to the present invention comprises a multiplicity of support members arranged and configured so as to form any of a number of other self-supporting structures that can be adapted for use to form a support frame for supporting a skater 2. There is shown in FIG. 6 a support frame 310 including three support members 320 that each include an arcuate segment 324 and a single straight segment 324, where the straight segment in effect forms a leg of the support frame.

Each arcuate segment 324a proximal to an end thereof is interconnected to each other by the interconnecting mechanism 130 in a similar fashion to that described above at a common point so that the long axis of the straight segments 324b are equidistantly spaced from the common point. Additionally the arcuate segments 324a are secured so that each are at an angle with respect to each other. In a particular embodiment, the arcuate segments 324a are secured to each other at the common point so that a long axis of each arcuate segment is equiangular spaced from the long axis of each other arcuate segment about the common point. Similar to the support frame illustrated in FIG. 4A, the cross members are secured to the straight segments 324b so as to maintain the support members 320a in fixed relation. Reference also shall be made to the foregoing discussion for FIGS. 1–4 other details of the support members 320 of this embodiment as well as the various above-described cross-member attachment embodiments that maintain these support members 320 in fixed relation.

Figure 7:
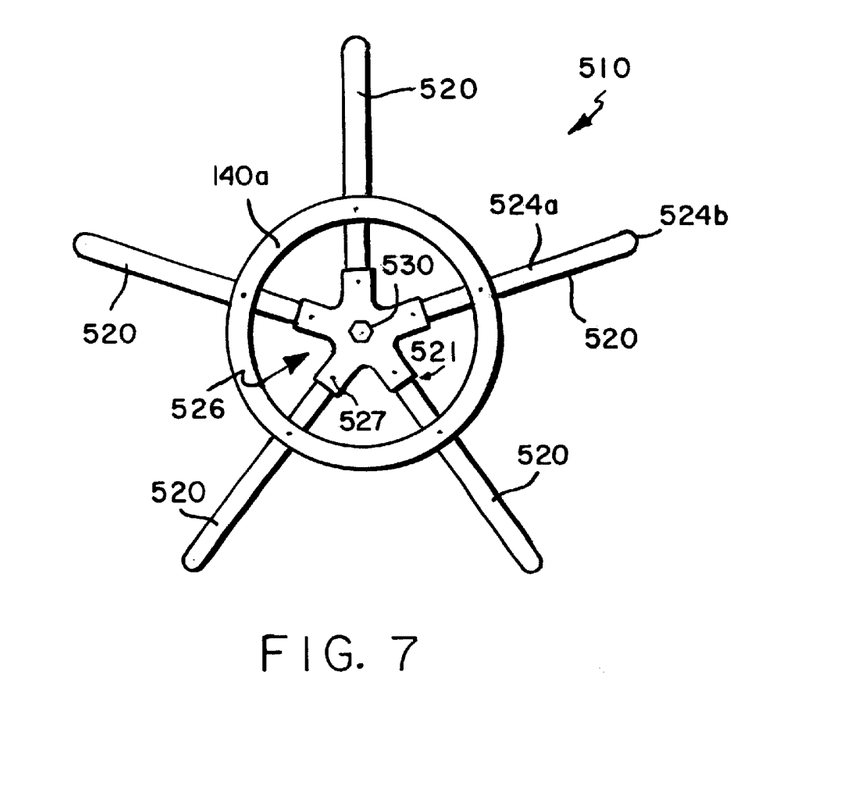
FIG. 7 is a top view of another alternative support frame for a skating training device according to the present invention.

There is shown in FIG. 7 yet another embodiment of a support frame 510 including five support members 520 and a hub member 526. Each support member 520 includes an arcuate segment 524a and a single straight segment 524b, where the straight segment in effect forms one leg of the support frame. As described above, each support member is formed so as to be a unitary member or so as to comprise a plurality or more of interconnected sections.

The hub member 526 is configured or arranged to include a multiplicity or more of spoke segments 527 that extend radially from a center point of the hub member. The number of spoke segments 527 at least corresponds to the number of support members 520 comprising the support frame 510. In the illustrated embodiment, the hub member 526 includes five spoke segments, however, this is not a limitation as the hub member 526 can be configured with three, four, five or more spoke segments. Additionally, the spoke segments 527 are arranged in a preferred embodiment so that the radii of each spoke segment are equiangular spaced from each other about the hub member center point.

The end of each spoke segment 527 is configured or arranged so as to engage an end 521 of the support member 520 so as to form the support frame 510 for the skating training device 100 (FIG. 1). In an exemplary embodiment, each spoke segment end includes an aperture to receive the support member end 521 therein. The aperture in a more particular embodiment, is sized so the aperture inner surfaces frictionally engage the outer surfaces of the support member end 521 (e.g., a frictional or interference fit is established therebetween). In a more specific embodiment the support member end 521 being received in the aperture is configured with a reduced cross-sectional width as compared to other portions of the support member 520. A pin, nut and bolt or other mechanism or device known in the art can be utilized to mechanically secure the support member end 521 within the spoke segment 527 in lieu of the frictional engagement or in addition thereto. Alternatively, and similar to that shown in FIG. 6, each arcuate segment 524a proximal to an end thereof is interconnected to each other by an interconnecting mechanism 130 at a common point so that the long axis of the straight segments 524b are equidistantly spaced from the common point. Also, the arcuate segments 524a are secured so that each is at an angle with respect to each other at the common point so as to form a star shaped pattern where a long axis of each arcuate segment is equiangular spaced from the axis of the adjacent arcuate segments.

In the illustrated embodiment, an annular cross member 140a is secured to an upper portion of each of the support members 320. The so secured annular cross-member 140a maintain the support members 320 in fixed, spaced relation to each other during use of the skating training device 100 (FIG. 1). It is within the scope of the present invention, however, for one or more cross members 140 to be secured to adjacent support members as described hereinabove for FIGS. 1–4 so as to maintain the support member 520 in fixed, spaced relation. Reference also shall be made to the foregoing discussion regarding FIGS. 1–4 and 6 for other details of the support members 320, the annular cross member 140a of this embodiment and tha various other cross-members attachment embodiments described above.

The hub member 526 further includes an aperture or other means for receiving therein a support mechanism 530 that comprises a threaded rod member having a hook-eye 132 at one end thereof. The threaded rod member is secured to the hub member 526 using any of a number of well-known techniques. Alternatively, the hub member 526 can be formed so as to further include the support mechanism as a part thereof. For example, a lower surface of the hub member 526 can be arranged with a through eye that projects from the lower surfaces. Alternatively, the lower surface can be configured with a depressed region and a rod member extending across the depressed region so that the snap hook or hook eye 154 of the harness 150 can be secured to the rod member. The support mechanism 530 also can be secured to the hub member 526 such that the hook-eye 132 is rotatable with respect to the hub member, whereby the hook eye 154 can be a non-swiveling type of device.

Figure 8A:
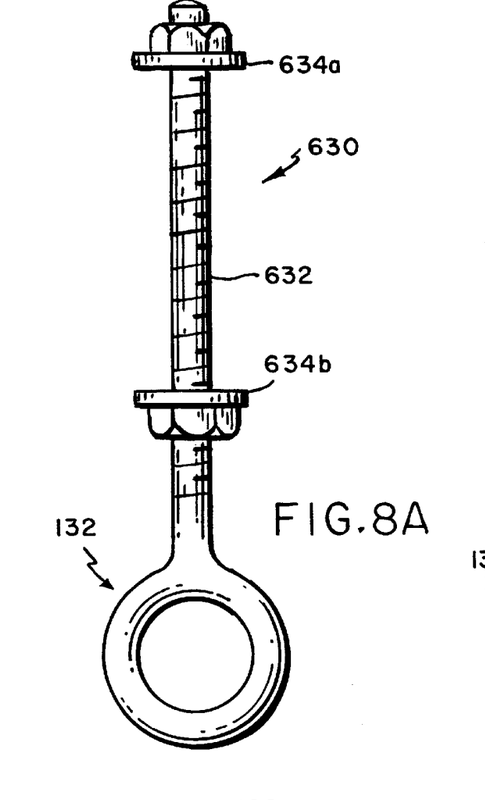
FIGS. 8A, and 9A are schematic elevation views of exemplary interconnecting mechanisms for use with a skating training device according to the present invention.

Referring now to FIGS. 8A,B there is shown an exemplary interconnecting mechanism 630 and a partial view of a support frame illustrating the application of such an interconnecting mechanism to secure two crossing support members such as that shown in FIGS. 1–4. This exemplary interconnecting mechanism 630 includes a threaded rod member 632 having a through eye 132 at one end thereof and two nut members 634a,b threadably received on the threaded rod member.

One nut member 634b is threaded onto the threaded rod member 632 so as to be proximal the hook eye 132 and so as to provide a length of the threaded rod member that is sufficient to pass completely and diametrically through each support member 120 at the midpoint 122. In the illustrated embodiment of FIG. 8B, each support member 120 includes a plurality of diametrically opposed through apertures 129a to receive therein the threaded rod member 632. Each through aperture 129a is configured and sized so as to complement the configuration and size of the threaded rod member such that the threaded rod member is slidably received in each of the through apertures.

Figure 8B:
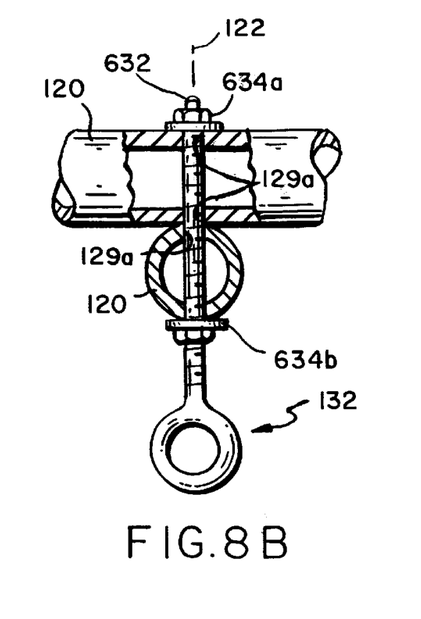
FIGS. 8B and 9B are schematic side views with partial breakaways of a part of a top portion of a skating training aid illustrating securing two support members using the exemplary interconnecting mechanism of FIGS. 8A and 9A respectively.

After the threaded rod member 632 is passed through the two or more support members 120 located at the midpoint 122, the other nut member 634a is threaded onto the threaded rod member. Each or both of the nut members 634a,b are tightened a sufficient amount so the support members 120 are securely disposed about the threaded rod member 632 and between the nut members. The reverse is performed to free the support member 120 and thus disassemble the support frame of the skating training device 100 (FIG. 1).

Figure 9A:
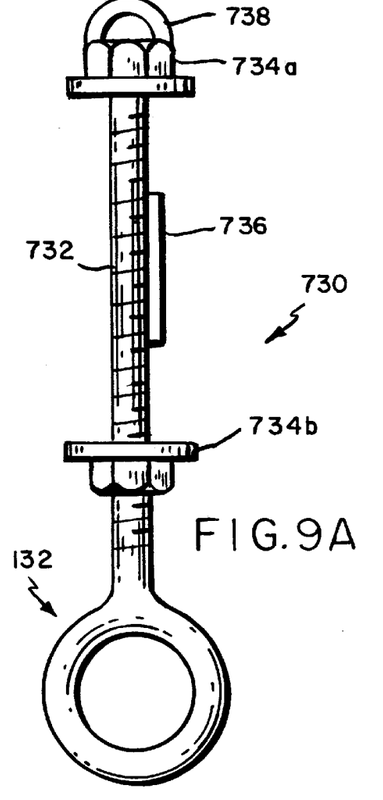

Now referring to FIGS. 9A,B there is shown another exemplary interconnecting mechanism 730 and a partial view of a support frame illustrating the application of such an interconnecting mechanism illustrating the application of such an interconnecting mechanism to secure two crossing support members 120 such as that shown in FIGS. 1–4. This exemplary interconnecting mechanism 630 includes a threaded rod member 732 thereof and two nut members 734a,b threadably received on the threaded rod member.

The threaded rod member 732 is configured and arranged so as to include a key portion 736 and a through-eye 132 at one end thereof. In the illustrated embodiment, the key portion 736 extends radially outward and along the long axis of the threaded rod member 732 (i.e. axially). In a more particular embodiment, the key portion 736 has an axial length sufficient so as to extend diametrically through at least a part of each support member 120. It is within the scope of the present invention, however, for the key portion to extend substantially through each support member 120. Although a key is shown, it should be recognized that any of a number of other techniques known in the art for selectively orienting interconnecting members can be used; for example, the threaded rod member 732 can be made from a square or hexagonal shaped member.

One nut member 734b is threaded onto the threaded rod member 732 so as to be proximal the hook eye 132 and so as to provide a length of the threaded rod member that is sufficient to pass completely and diametrically through each support member 120 at the midpoint 122. In the illustrated embodiment of FIG. 9B, each support member 120 includes one diametrically opposed through aperture 129a to receive therein the threaded rod member 632 and another diametrically opposed through aperture 129b that is configured with a keyway or slot to receive therein the key portion 736. These other through apertures 129b are configured and arranged such that when the key portion 736 is received in each slot, the support members 120 are in the desired orientation for forming a support frame; for example in an X or cross fashion.

Figure 9B:
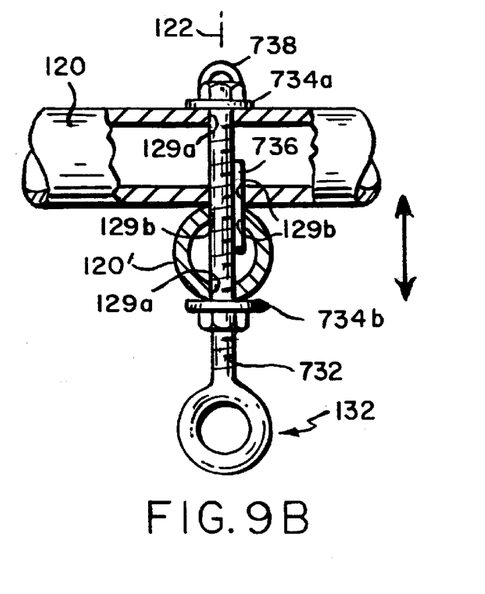

After the threaded rod member 732 is passed through the two or more support members 120 located at the midpoint 122, and the key portion located in the slot of the other through apertures 129b, the other nut member 734a is threaded onto the threaded rod member. Each or both of the nut members 734a,b are tightened a sufficient amount so the support members 120 are securely disposed about the threaded rod member 732 and between the nut members. The reverse is performed to free the support member 120 and thus disassemble the support frame of the skating training device 100 (FIG. 1).

In a more particular embodiment, the axial length of the key portion 736 is set so that when the lower nut member 734b is loosened a predetermined amount, the key portion can be withdrawn from the slot in the other through aperture 129b of the one or more lower support members. With reference to the embodiment illustrated in FIG. 9B, after the user loosens the lower nut member 734b the user grasps the handle portion 738 of the upper nut member 734a and pulls the threaded rod member 732 upwardly. This upward motion withdraws the key portion 736 from the slot in the other through aperture 129b of the lower support member 120'. After the key portion 736 is completely withdrawn from the other through aperture 129b, the lower support member 120' can be rotated about the threaded rod member 732 so the support members 120 can be arranged in line with each other whereby the support frame 110 is re-configured into a more compact form for storage. Correspondingly, when the support frame is to be assembled, the user again rotates the lower support member 120' about the threaded rod member 732 but in an opposite direction such that the key portion 736 is again received in the slot provided in the other through aperture 129b of the lower support member. Reference shall be made to the foregoing discussion regarding FIGS. 8A,B for common details and features not otherwise described here in connection with FIGS. 9A,B.

The skating training device according to the present invention yields a training aid that is lightweight and simple in construction and assembly but which is capable of supporting a skater while they are learning to stand or skate alone on a surface such as an icy surface. Such a skating training device is particularly advantageous for teaching children to skate because it allows the child to build confidence while allowing the child to be on his or her own. It also allows the parents of such children to also skate without worrying about an accident or injury to the child from falling while skating. Such a skating and training device also eliminates the need for a trained skater to hold or otherwise support the beginning skater. The skating training device of the present invention allows a skater to learn to skate and to try and try again without the restrictions imposed on such a learning process because of the fear of falling and the injuries that can be caused thereby. Such a skating and training device also allows the beginning skater to distribute 100% of their weight onto an icy surface and thus provides an effective training aid for developing a sense of balance.

Although a preferred embodiment of the invention has been described using specific terms, such description is for illustrative purposes only, and it is to be understood that changes and variations may be made without departing from the spirit or scope of the following claims.

What is claimed is:

1. A training device for use by a skater who is skating on a surface comprising:
    a support frame having an attachment point, where the skater is disposed within the support frame when using the training device;
    a harness that is configured so a portion thereof is removably secured about the skater and where the harness is secured to the support frame attachment point;
    wherein the support frame is configured and sized so that:
        (a) distal ends of the support frame include a mechanism that is in contact with the surface and by which the support frame moves upon the surface,
        (b) the support frame attachment point is disposed substantially equidistant from the points of contact with the surface,
        (c) the support frame attachment point is disposed above the head of the skater when the skater is located within the support frame, and (d) the support frame is spaced from and about the skater when the skater is located within the support frame and secured within the harness; and wherein movement of the skater is communicated via the harness and the attachment point to the support frame so as to cause the support frame to move upon the surface.

2. The training device according to claim 1, wherein the skating surface is ice and wherein the mechanism is configured so the support frame is slidably disposed on the ice.

3. The training device according to claim 1, wherein the harness is pivotably mounted at the support frame attachment point.

4. The training device according to claim 1, wherein a portion of the support frame including the attachment point is shaped like a dome, and where the attachment point is located at a vertex of the dome.

5. The training device according to claim 1, wherein:
the support frame includes three support members, each having a proximal end and a first portion extending from the proximal end;
the proximal ends of each of the three support members are secured to each other so the first portions of the three support members are spaced from each other about a common point and disposed a distance above the head of the skater; and
the attachment point is located at the common point.

6. The training device according to claim 5, wherein each support member further includes a second portion mechanically interconnected to the member first portion and wherein the second portions of the three support members are spaced laterally from the skater when the skater is disposed within the support frame and secured in the harness.

7. The training device according to claim 5, wherein the support frame further includes cross members extending between adjacent members of the three support members so as to maintain the three support members in fixed relation.

8. The training device according to claim 5, wherein the support frame further includes four support members.

9. The training device according to claim 1, wherein:
the support frame includes a plurality of support members, each support member having first, second and third portions where the first and third portions are mechanically interconnected to opposite ends of the second portion and where each of the first and third portions are at an angle with respect to the second portion;
the second portions of the respective plurality of support members are secured to each other at a point of intersection so the second portions are at a second angle with respect to each other; and
the attachment point is located at the point of intersection.

10. The training device according to claim 9, wherein the each support member is formed so as to be generally in the shape of a parabola and wherein the point of intersection corresponds to the vertex of the parabola.

11. The training device according to claim 9, wherein the angle between the support member first and second portions and the third and second portions is established so the support frame supports the weight of the skater.

12. The training device according to claim 9, wherein the second portions of the respective plurality of support members are secured to each other at the point of intersection so the second portions are at an angle of about 90 degrees with respect to each other.

13. The training device according to claim 9, wherein the support frame further includes cross members extending between adjacent portions of the plurality of support members so as to maintain the three support members in fixed relation.

14. The training device according to claim 9, wherein the skating surface is ice and wherein the mechanism at each distal end of the plurality of support members is configured so the support frame is slidably disposed on the ice.

15. The training device according to claim 9, wherein the harness is pivotably mounted at the support frame attachment point.

16. A method for training a skater who is skating on a surface comprising the steps of:
providing a support frame having an attachment point and a harness that is disposed within the support frame and is secured to the support frame attachment point;
securing the skater within the harness so the skater is thereby secured to the support frame;
wherein the support frame being provided is configured and sized so:
the support frame attachment point is disposed substantially equidistant from the points of contact with the surface,
the support frame attachment point is disposed above the head of the skater when the skater is located within the support frame, and
the support frame is spaced from and about the skater when the skater is located within the support frame and secured within the harness; and
communicating skating motion of the skater within the support frame via the harness and the attachment point to the support frame so as to cause the support frame to move upon the surface.

17. A method for training a skater who is skating on a surface comprising the steps of:
providing a training device for use by a skater, the training device including:
a support frame having an attachment point, where the skater is disposed within the support frame when using the training device;
a harness that is configured so a portion thereof is removably secured about the skater and where the harness is secured to the support frame attachment point;
wherein the support frame is configured and sized so that:
(a) distal ends of the support frame include a mechanism that is in contact with the surface and by which the support frame moves upon the surface,
(b) the support frame attachment point is disposed substantially equidistant from the points of contact with the surface,
(c) the support frame attachment point is disposed above the head of the skater when the skater is located within the support frame, and
(d) the support frame is spaced from and about the skater when the skater is located within the support frame and secured within the harness;
securing the skater within the harness so the skater is thereby secured to the support frame; and
communicating skating motion of the skater within the support frame via the harness and the attachment point to the support frame so as to cause the support frame to move upon the surface.

* * * * *